US012309776B2

United States Patent
Zhang et al.

(10) Patent No.: US 12,309,776 B2
(45) Date of Patent: May 20, 2025

(54) RADIO LINK MONITORING FOR MULTI-DCI BASED TRANSMISSIONS

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Fangli Xu, Beijing (CN); Haijing Hu, Los Gatos, CA (US); Haitong Sun, Cupertino, CA (US); Hong He, San Jose, CA (US); Wei Zeng, Saratoga, CA (US); Yakun Sun, San Jose, CA (US); Yuchul Kim, San Jose, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 17/761,393

(22) PCT Filed: Sep. 29, 2019

(86) PCT No.: PCT/CN2019/108880
§ 371 (c)(1),
(2) Date: Mar. 17, 2022

(87) PCT Pub. No.: WO2021/056510
PCT Pub. Date: Apr. 1, 2021

(65) Prior Publication Data
US 2022/0377775 A1  Nov. 24, 2022

(51) Int. Cl.
*H04W 72/1273* (2023.01)
*H04B 7/06* (2006.01)
(Continued)

(52) U.S. Cl.
CPC .... *H04W 72/1273* (2013.01); *H04B 7/06964* (2023.05); *H04W 36/0055* (2013.01);
(Continued)

(58) Field of Classification Search
CPC ............ H04W 36/085; H04W 72/046; H04W 72/20–21; H04W 76/19;
(Continued)

(56) References Cited

U.S. PATENT DOCUMENTS

| 11,569,896 B2 * | 1/2023 | Yang ..................... H04W 16/28 |
| 11,799,715 B2 * | 10/2023 | Yang ..................... H04B 7/088 |

(Continued)

FOREIGN PATENT DOCUMENTS

| CN | 108540985 A | 9/2018 |
| CN | 109802758 | 5/2019 |

(Continued)

OTHER PUBLICATIONS

Nokia et al. "Failure Detection Resources for BFR", 3GPP TSG RAN WG1 #96 R1-1902561; Feb. 25, 2019.*
(Continued)

*Primary Examiner* — Brendan Y Higa
(74) *Attorney, Agent, or Firm* — Kowert, Hood, Munyon, Rankin & Goetzel, P.C.

(57) ABSTRACT

Apparatuses, systems, and methods for a user equipment device (UE) to perform methods for radio link monitoring for multiple DCI based transmissions. The UE may receive, from a network node, a configuration for multiple downlink control information (DCI) mode operation in which a physical downlink shared channel (PDSCH) is scheduled by multiple DCIs from a number of control resource sets (CORESETs). The number of CORESETs may exceed a number of CORESETs the UE can monitorable. The UE may determine a set of CORESETs to monitor based, at least in part, on one or more CORESET properties. The set of CORESETs to monitor may be less than the number of (Continued)

CORESETs. Additionally, the UE may monitor the set of CORESETs for at least one of a radio link failure or a beam failure.

20 Claims, 15 Drawing Sheets

(51) Int. Cl.
| | | |
|---|---|---|
| *H04W 36/00* | (2009.01) | |
| *H04W 36/08* | (2009.01) | |
| *H04W 36/30* | (2009.01) | |
| *H04W 72/23* | (2023.01) | |
| *H04W 72/231* | (2023.01) | |
| *H04B 7/08* | (2006.01) | |
| *H04W 24/08* | (2009.01) | |
| *H04W 72/044* | (2023.01) | |

(52) U.S. Cl.
CPC ....... *H04W 36/085* (2023.05); *H04W 36/305* (2018.08); *H04W 72/231* (2023.01); *H04B 7/088* (2013.01); *H04W 24/08* (2013.01); *H04W 72/046* (2013.01); *H04W 72/23* (2023.01)

(58) Field of Classification Search
CPC ......... H04W 72/23–232; H04B 7/0617; H04B 7/0695; H04B 7/088
See application file for complete search history.

(56) References Cited

U.S. PATENT DOCUMENTS

| | | | | |
|---|---|---|---|---|
| 2019/0081753 A1* | 3/2019 | Jung | ..................... | H04L 1/1854 |
| 2019/0174385 A1* | 6/2019 | Sang | ..................... | H04W 40/12 |
| 2019/0253308 A1* | 8/2019 | Huang | ................ | H04L 43/0823 |
| 2020/0077283 A1* | 3/2020 | Zhou | ..................... | H04W 24/04 |
| 2022/0022065 A1* | 1/2022 | Wang | ................... | H04B 7/0695 |
| 2022/0200687 A1* | 6/2022 | Guo | ................... | H04L 27/2613 |

FOREIGN PATENT DOCUMENTS

| | | | |
|---|---|---|---|
| CN | 110166203 A | 8/2019 | |
| EP | 3826351 A1 * | 5/2021 | ............ H04L 5/001 |
| WO | 2019021489 A1 | 1/2019 | |

OTHER PUBLICATIONS

Office Action for KR Patent Application No. 10-2022-7010410; Jul. 29, 2024.
Nokia et al. "Failure Dtection Resources for BFR", 3GPP TSG RAN WG1 #96 R1-1902561; Feb. 25, 2019.
Huawei et al. "Summary of Enhancements on Multi-TRP/Panel Transmission", 3GPP TSG RAN WG1 Meeting #98 R1-1909602, Aug. 26, 2019.
International Search Report and Written Opinion for PCT/CN2019/108880; 9 pages; Jun. 29, 2020.
Huawei et al. "Summary of Remaining Issues on PDCCH Monitoring with TP;" 3GPP TSG RAN WG1 Meeting #92 R1-1801338; Athens, Greece; 4 pages; Mar. 2, 2018.
Huawei et al. "UE Procedure of PDCCH Monitoring for URLLC;" 3GPP TSG RAN WG1 Meeting #90bis R1-1717084; Prague, Czech Republic: 5 pages; Oct. 13, 2017.
CMCC "Discussion on Remaining Issues on Beam Failure Recover;" 3GPP TSG RAN WG1 Meeting #92bis R1-1804094; Sanya, China; 6 pages; Apr. 20, 2018.
Extended European Search Report for EP Patent Application No. 19947149.1; Apr. 25, 2023.
3GPP Draft; List of RAN1 Agreements, 3rd Generation Partnership Project; vol. RAN WG1, No. 20170901; Sep. 2017.
Office Action for CN Patent Application No. 201980100891.9; Oct. 26, 2024.
Office Action for CN 201980100891.9; Mar. 26, 2025.
Huawei et al. "Remaining issues on beam failure recovery" 3GPP TSG RAN WG1 Meeting #93 R1-180593; May 21, 2018.
Ericsson "Enhancements to multibeam operation" 3GPP TSG RAN WG1 Meeting #98 R1-1909225; Aug. 26, 2019.
Ericsson "TCI states definition" 3GPP TSG RAN1 Meeting #97 R1-1907429; May 13, 2019.

* cited by examiner

RADIO LINK MONITORING FOR MULTI-DCI BASED TRANSMISSIONS

PRIORITY DATA

This application is a national stage application, filed under 35 U.S.C. § 371, of International Patent Application No. PCT/CN2019/108880 filed on Sep. 29, 2019, which is incorporated by reference herein in its entirety.

FIELD

The present application relates to wireless devices, and more particularly to apparatuses, systems, and methods for a wireless device to perform radio link monitoring for multiple DCI based transmissions.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for a UE to perform radio link monitoring for multiple DCI based transmissions.

In some embodiments, a wireless device, e.g., such as a user equipment device (UE), may be configured to receive, from a network node, a configuration for multiple downlink control information (DCI) mode operation in which a physical downlink shared channel (PDSCH) is scheduled by multiple DCIs from a number of control resource sets (CORESETs). The number of CORESETs may exceed a number of CORESETs the UE can monitor. In other words, the number of configured CORESETs may exceed a number of CORESETs the UE is capable of concurrently monitoring. The wireless device may be configured to determine a set of CORESETs to monitor based, at least in part, on one or more CORESET properties. The set of CORESETs to monitor may be less than the number of CORESETs. Additionally, the wireless device may be configured to monitor the set of CORESETs for at least one of a radio link failure or a beam failure. In some embodiments, the one or more CORESET properties may include a higher layer index and a monitoring periodicity of a search space associated with a CORESET. In some embodiments, the wireless device may be configured to select CORESETs based on monitoring periodicity from lowest monitoring periodicity to highest monitoring periodicity or vice versa. In some embodiments, when CORESETs have identical (or equivalent) monitoring periodicities, the wireless device may be configured to select from the CORESETs that have identical (or equivalent) monitoring periodicities based on a higher layer index of a CORESET. In some embodiments, the wireless device may select from highest higher layer index to lowest higher layer index or vice versa. In some embodiments, the wireless device may be configured to select CORESETs based on a higher layer index of a CORESET from lowest higher layer index to highest higher layer index or vice versa. In some embodiments, when CORESETs have identical (or equivalent) higher layer indexes, the wireless device may be configured to select from the CORESETs that have identical (or equivalent) higher layer indexes based on a monitoring periodicity. In some embodiments, the wireless device may select from highest monitoring periodicity to lowest monitoring periodicity or vice versa.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
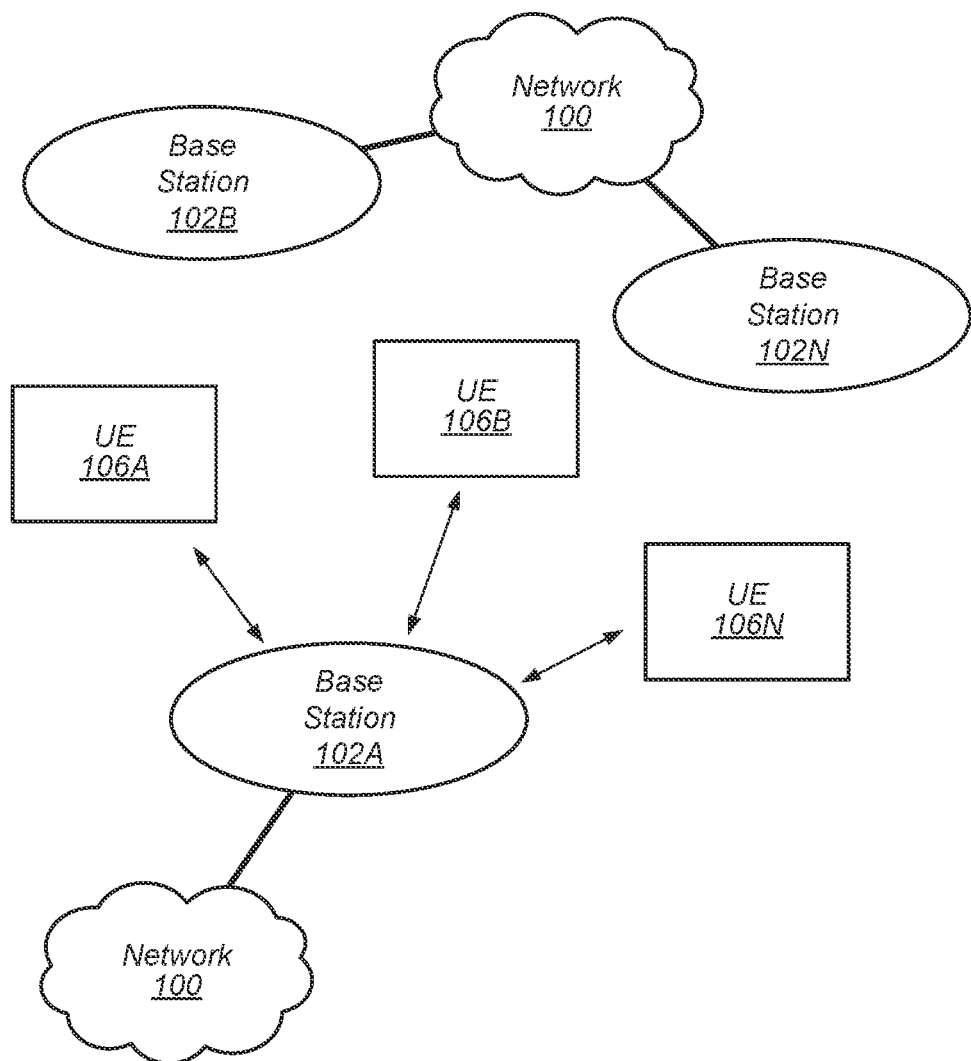
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
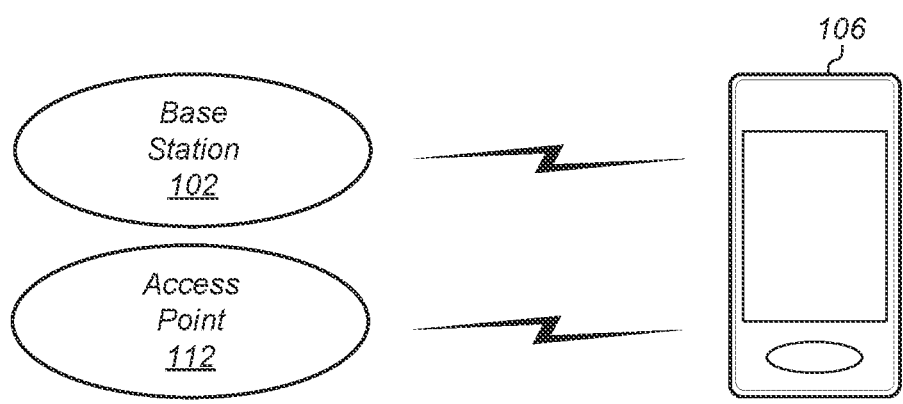
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
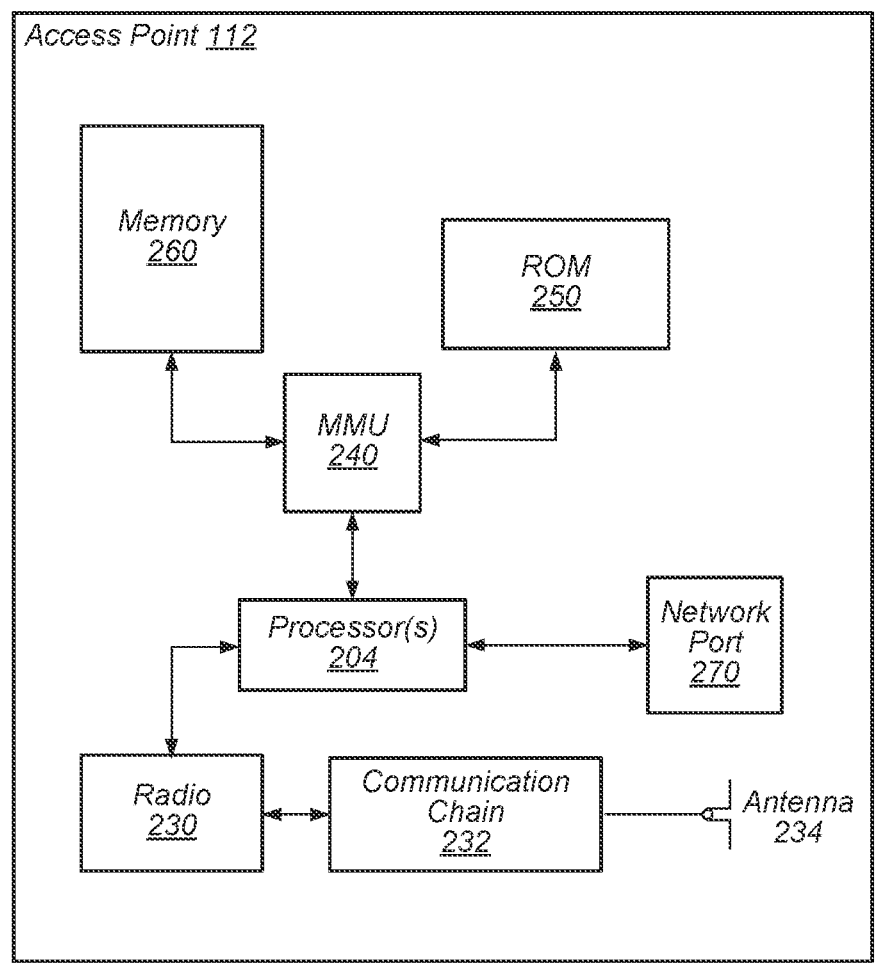
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for radio link monitoring for multiple DCI based transmissions as further described herein.

Figure 3:
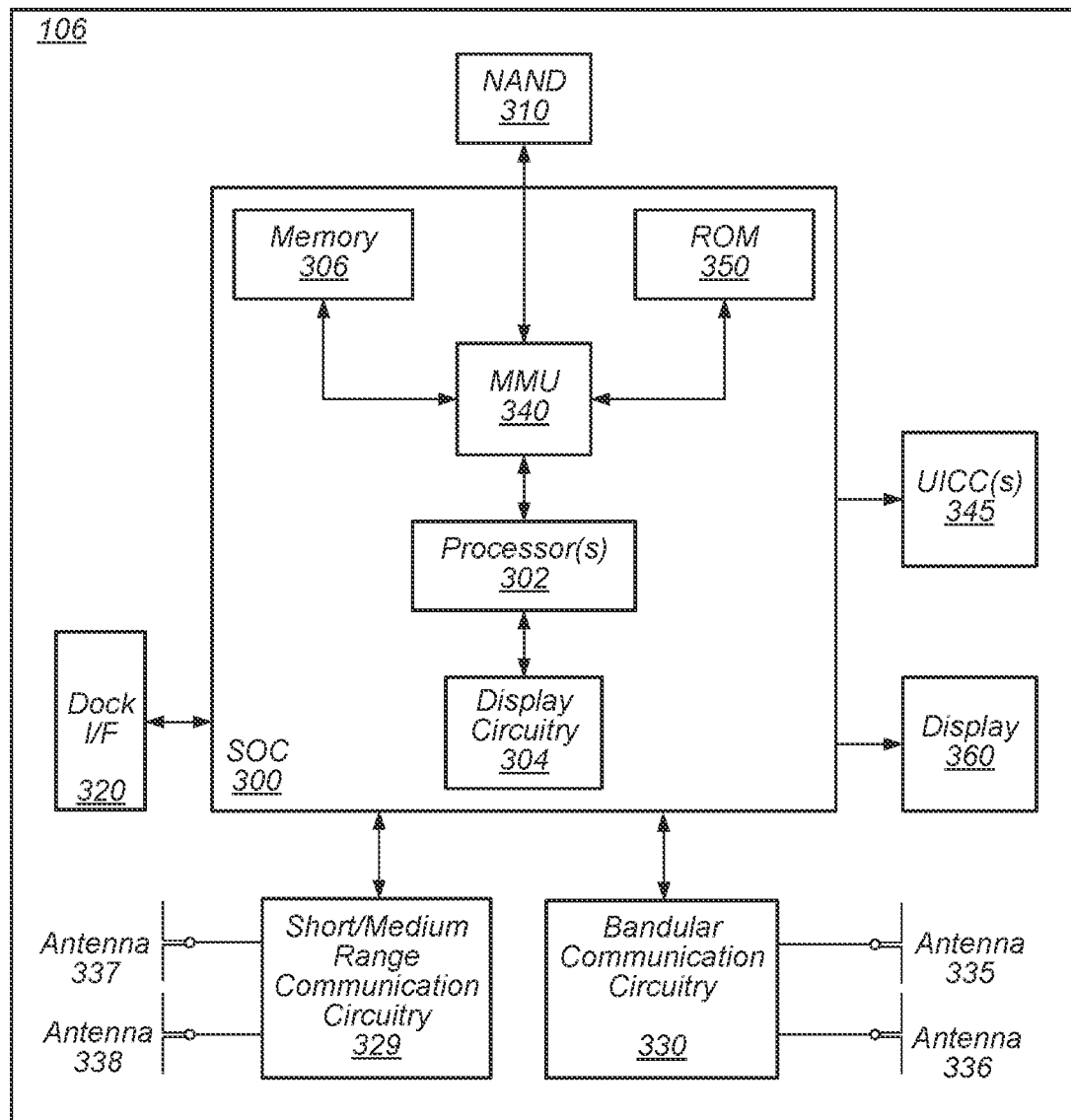
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for radio link monitoring for multiple DCI based transmissions as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
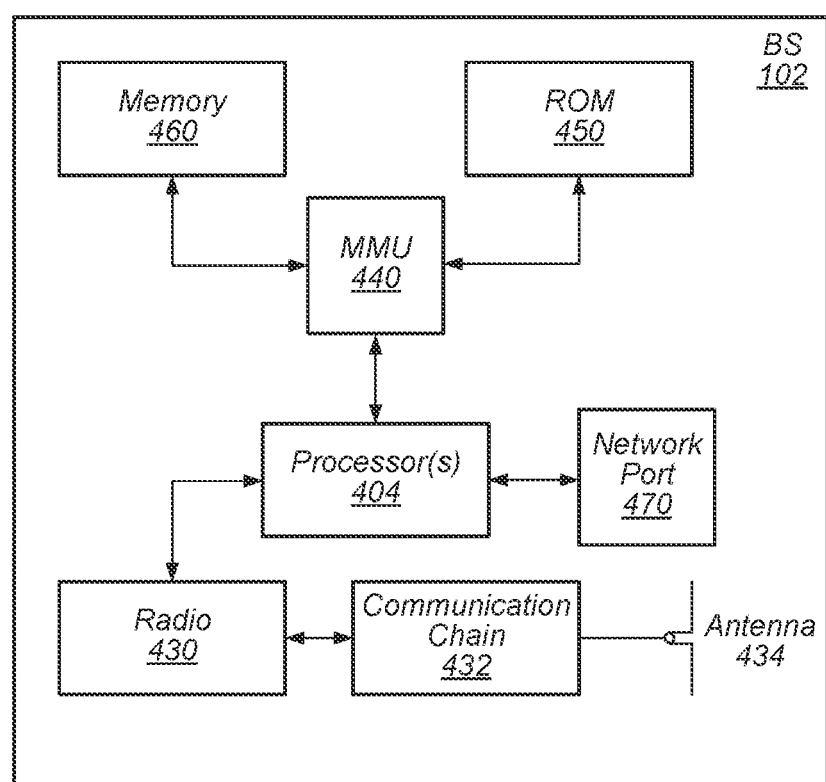
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430.

Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
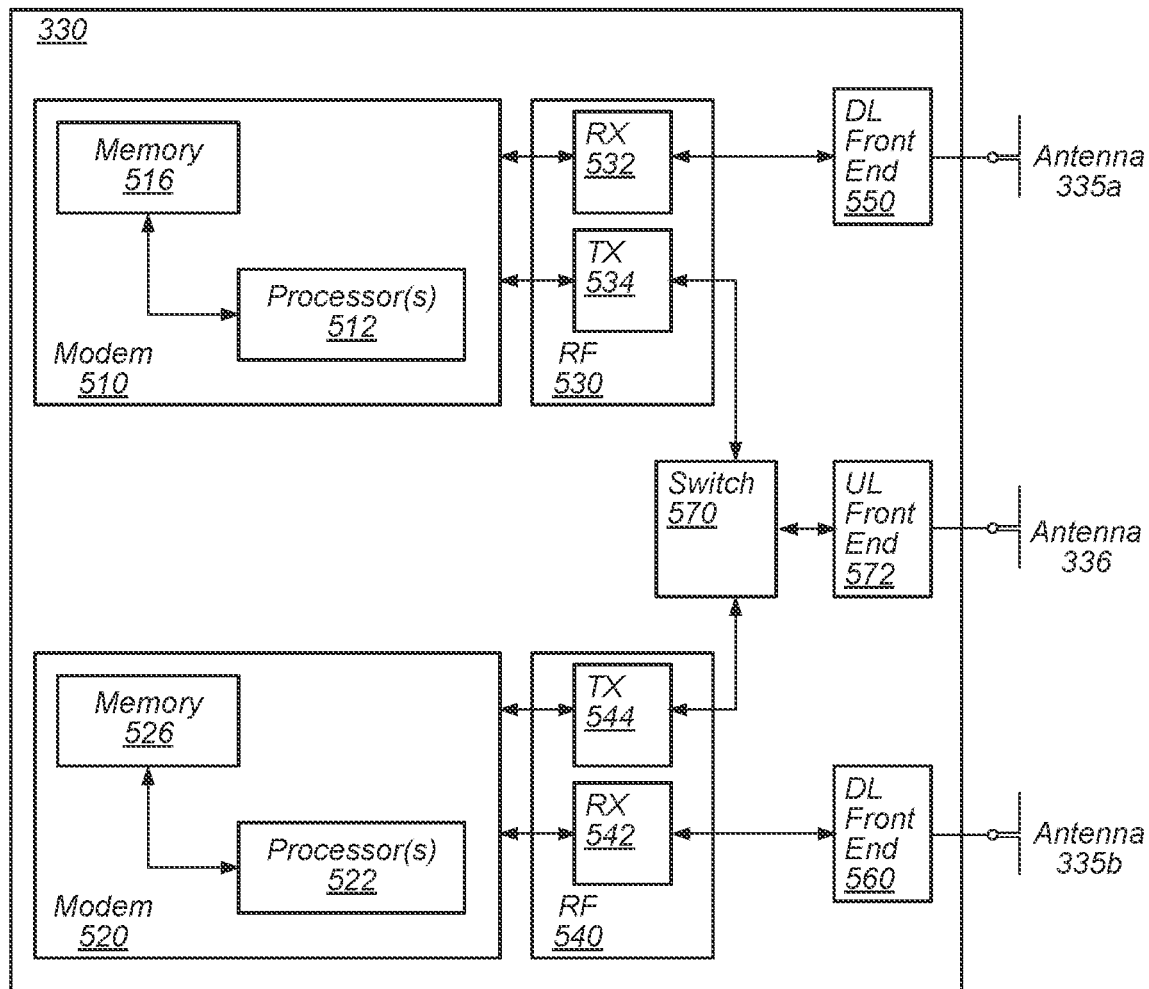
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for radio link monitoring for multiple DCI based transmissions as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
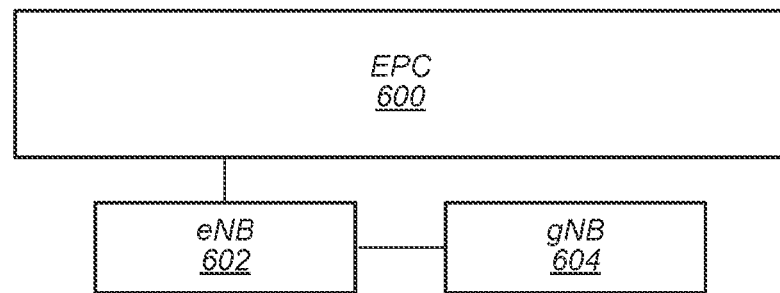
FIG. 6A illustrates an example of connections between an EPC network, an LTE base station (eNB), and a 5G NR base station (gNB).
Figure 6B:
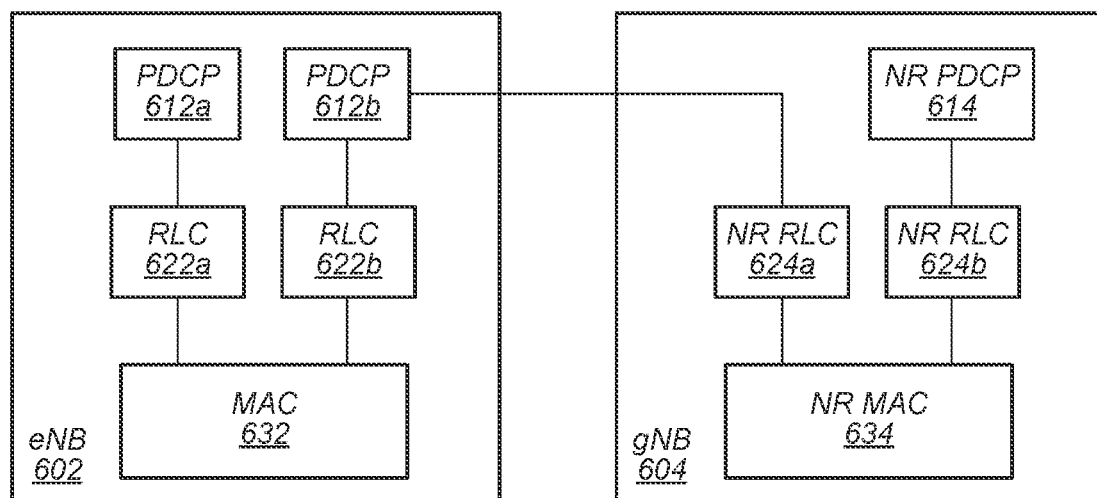
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer with EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an $X_2$ interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
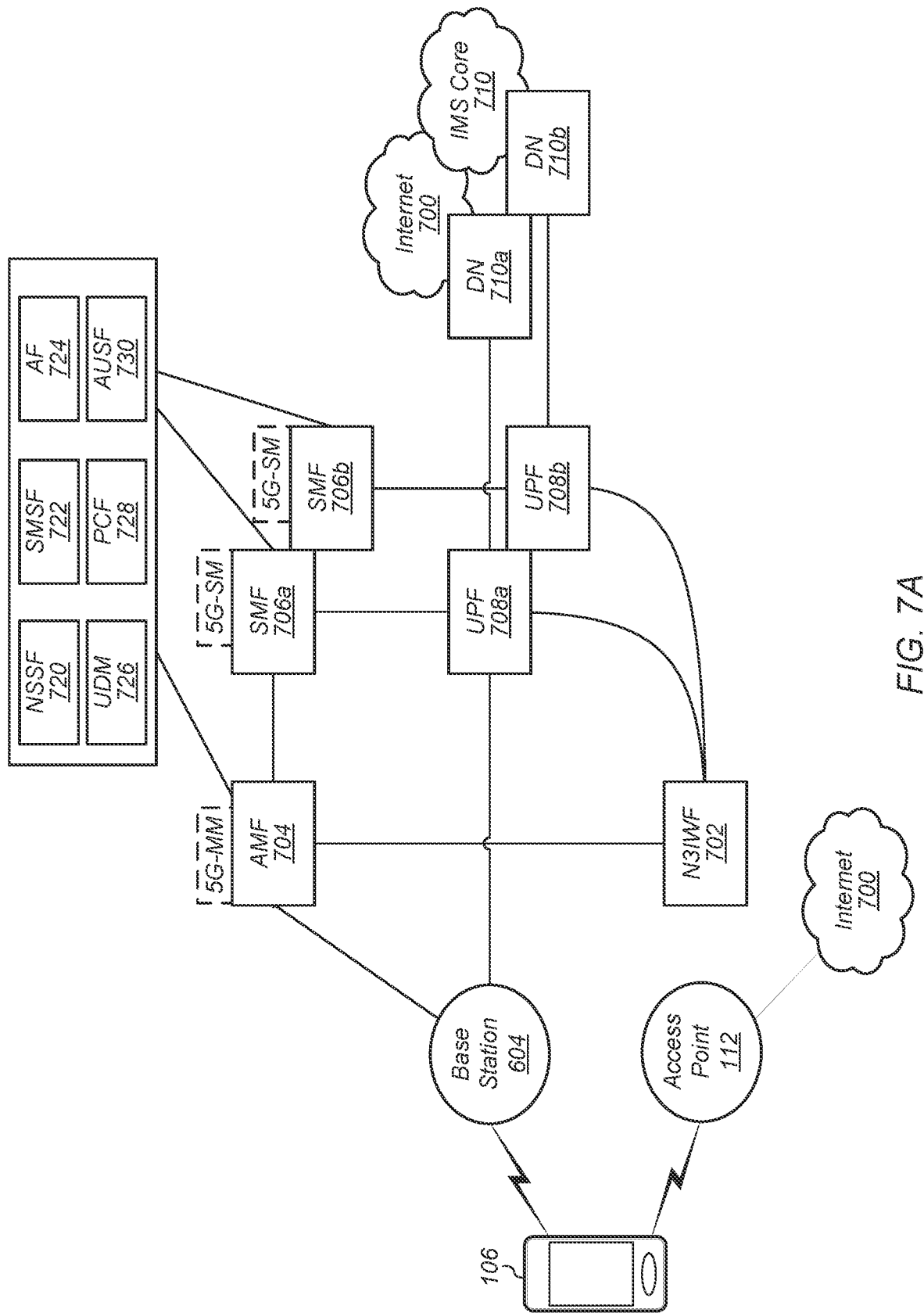
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Figure 7B:
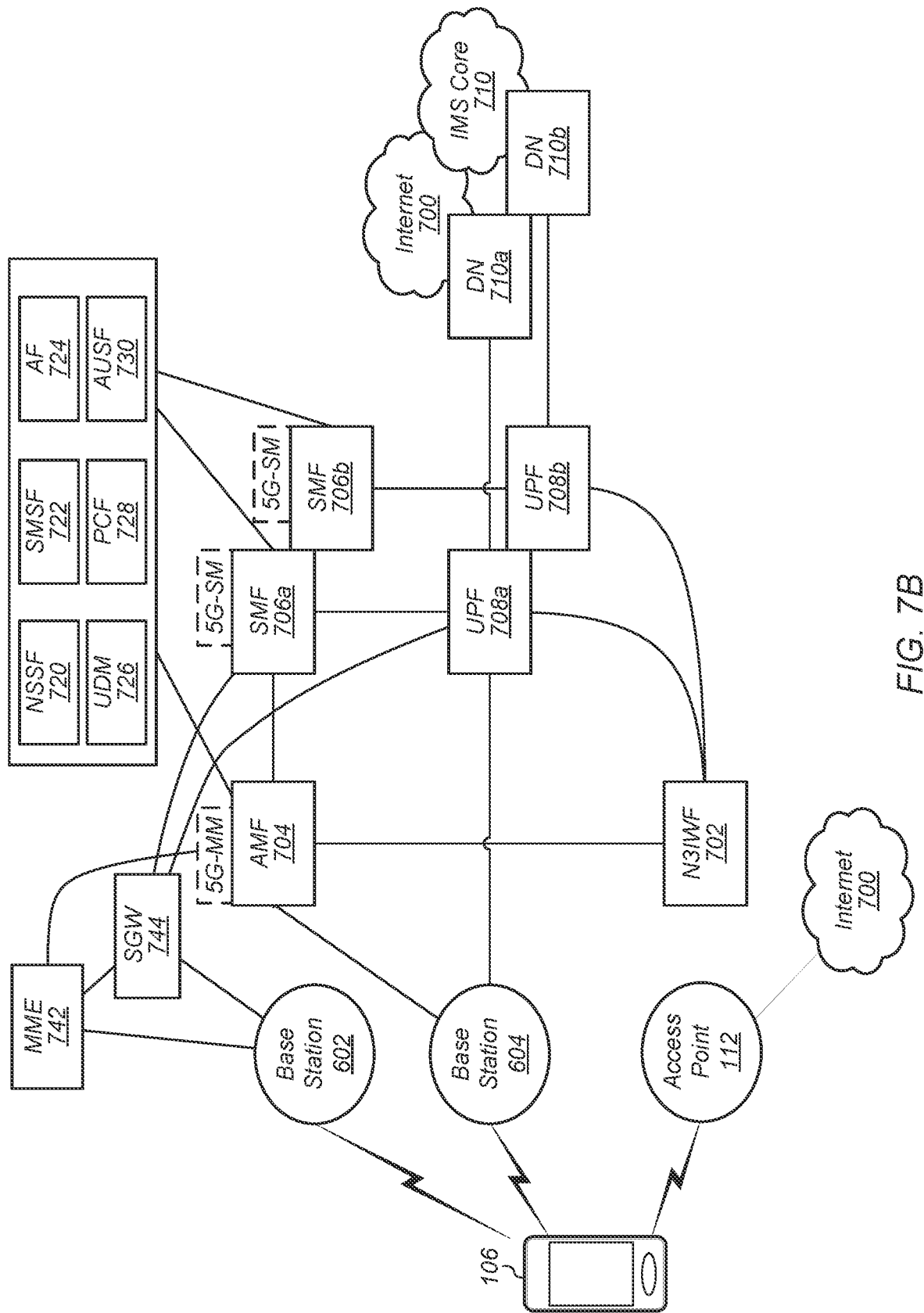
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to perform methods for radio link monitoring for multiple DCI based transmissions, e.g., as further described herein.

Figure 8:
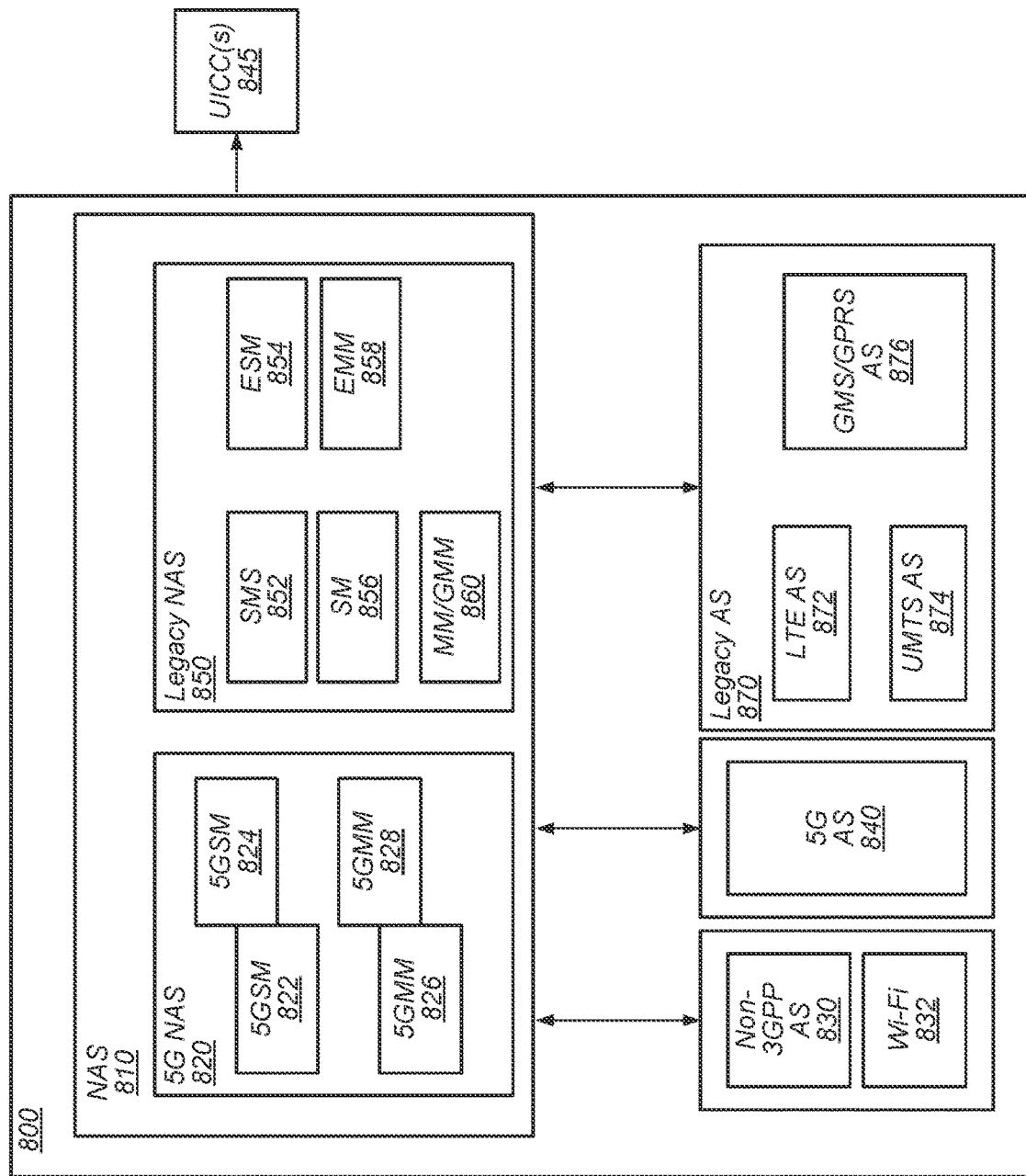
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access straturns. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for radio link monitoring for multiple DCI based transmissions, e.g., as further described herein.

RLM for Multi-DCI Based Transmissions

In current implementations, a mobile station may monitor radio link conditions (e.g., primary cell (Pcell) monitoring and/or radio link monitoring (RLM) to aid in detection and mitigation of a radio link failure (RLF). For example, in 3GPP Release version 15 (Rel-15), a mobile station may monitor radio link quality for multiple downlink signals (e.g., via monitoring of multiple synchronization signal blocks (SSBs) and/or via monitoring of channel state information reference signal (CSI-RS) resources). In some implementations, if configured via radio resource control (RRC) signaling, the SSBs/CSI-RS resources may be quasi-co-located (QCLed) within different control resource sets (CORESETs). Alternatively, a CSI-RS resource configured in a transmission configuration indication (TCI) state for the CORESETs may be used for RLM. Note that in some implementations, if multiple CSI-RS resources are configured in a TCI state, a CSI-RS resource used to indicate quasi-co-location (QCL) type-D (e.g., a spatial receive parameter) may be used for RLM. In some implementations, the number of SSBs may be used to determine the number of downlink signals to monitor. For example, for 4 SSBs, 2 downlink signals may be monitored and for 8 SSBs, 4 downlink signals may be monitored. Additionally, if quality of all corresponding SSBs/CSI-RS resources are below a threshold, the mobile station may indicate an out-of-sync condition (or failure) to higher layers. The higher layers may monitor a number of out-of-sync indications and may declare an RLF when the number of out-of-sync indications exceeds a threshold.

Further, in 3GPP Release version 16 (Rel-16), a wireless station may be configured in a multiple downlink control information (multi-DCI) mode in which a physical downlink shared channel (PDSCH) may be scheduled by multiple DCIs from different CORESETs with differing TCIs and from differing transmission resource patterns (TRPs). In some implementations, a higher layer index may be configured in a CORESET to imply a TRP index. In addition, a maximum number of CORESETs may be increased from 3 to 5. However, with such an increase for multi-DCI mode, if SSD/CSI-RS for RLM is not explicitly configured by RRC signaling, it is unclear how to select an SSB/CSI-RS resource for monitoring. For example, when 5 CORESETs are configured and there are 8 SSBs, it is not known which reference signals (e.g., which 4 resources signals should be monitored).

Additionally, in some implementations, such as Rel-15, aperiodic and semi-persistent CSI-RS may not be allowed to be configured for RLM. Additionally, since a TCI for aperiodic and semi-persistent CSI-RS could be updated too fast (e.g. by DCI/MAC CE), thus, for periodic CSI-RS, only RRC can be used to update TCI. Conversely, in some implementations, e.g., such as Rel-16, a MAC CE may be introduced to update the TCI for periodic CSI-RS. However, since delay of MAC CE is much smaller than RRC, maintaining an RLM procedure may become as issue (note similar issues may arise in beam failure detection (BFD)).

Embodiments described herein provide systems, methods, and mechanisms for a user equipment device (UE), such as UE 106, to perform radio link monitoring for multiple DCI based transmissions. In some embodiments, if/when a reference signal (RS) for radio link monitoring (RLM) is not configured via radio resource control (RRC) signaling, e.g., for multi-DCI mode, the UE may monitor the RS in TCI states for a CORESET with a higher layer index K for RLM. For example, in some embodiments, K may be predefined. In some embodiments, K may be configured via higher layer signaling, such as RRC signaling.

In some embodiments, if/when an RS for RLM is not configured via RRC, e.g., for multi-DCI mode, the UE may determine an RS in TCI states for a CORESET(s) based, at least in part, on a monitoring periodicity of a search space associated with the CORESET(s) and/or a CORESET ID (e.g., a higher layer index). In some embodiments, if/when multiple search spaces are associated with a CORESET, a search space may be selected based, at least in part, on one or more of a minimum monitoring periodicity, a maximum monitoring periodicity, a minimum CORESET ID, and/or a maximum CORESET ID. For example, a UE may select CORESETs with minimum monitoring periodicity and if/when the monitoring periodicity is the same for two or more selected CORESETs, the UE may select a CORESET with a maximum CORESET ID. As another example, a UE may select CORESETs with maximum monitoring periodicity and if/when the monitoring periodicity is the same for two or more selected CORESETs, the UE may select a CORESET with a minimum CORESET ID. Note that such combinations are exemplary and other combinations are possible as well.

In some embodiments, if/when an RS for RLM is not configured via RRC, e.g., for multi-DCI mode, the UE may determine an RS in TCI states for a CORESET(s) based on a monitoring periodicity of a search space associated with the CORESET(s), a CORESET ID, and a higher layer index configured in the CORESET(s). In some embodiments, a CORESET with a minimum monitoring periodicity may be selected. In some embodiments, a CORESET with a maximum monitoring periodicity may be selected. In some embodiments, a CORESET with a minimum CORESET ID may be selected. In some embodiments, a CORESET with a maximum CORESET ID may be selected. For example, a UE may rank (or count) an RS based on the following priority: (1) higher layer index in a CORESET, (2) monitoring periodicity for the CORESET, and (3) CORESET ID.

In some embodiments, such mechanisms as described herein to monitor radio link failure may also be implemented for beam failure detection. In some embodiments, an RS for TCI in CORESETs may indicate an RS configured for QCL-typeD in TCI when more than 1 RS are configured in a TCI. In some embodiments, a MAC CE may not be used to update a TCI state for periodic CSI-RS for radio link monitoring. In such embodiments, a MAC CE may be used to update TCI state for periodic CSI-RS for other purposes. Additionally, in some embodiments, a MAC CE may not be used to update the TCI state for periodic CSI-RS for beam failure detection. In some embodiments, after a UE applies a new TCI state indicated by MAC CE, a counter (e.g., counter N310 and/or counter N311) for RLM may be reset. In some embodiments, counter N310 may be used for out-of-sync and counter N311 may be used for in-sync. Additionally, in some embodiments, after a UE applies a new TCI state indicated by MAC CE, a BFI_counter and/or a beamFailureRecoveryTimer may be reset. For example, in some embodiments, a standards document, e.g., 3GPP TS 38.321 may be updated to recite:

1> if beamFailureDetectionTImer, beamFailureInstanceMaxCount, or any of the reference signals used for beam failure detection, or any of the TCI state of the reference signals used for beam failure detection is reconfigured by upper layers:
2> set BFI_COUNTER to 0.

Figure 9:
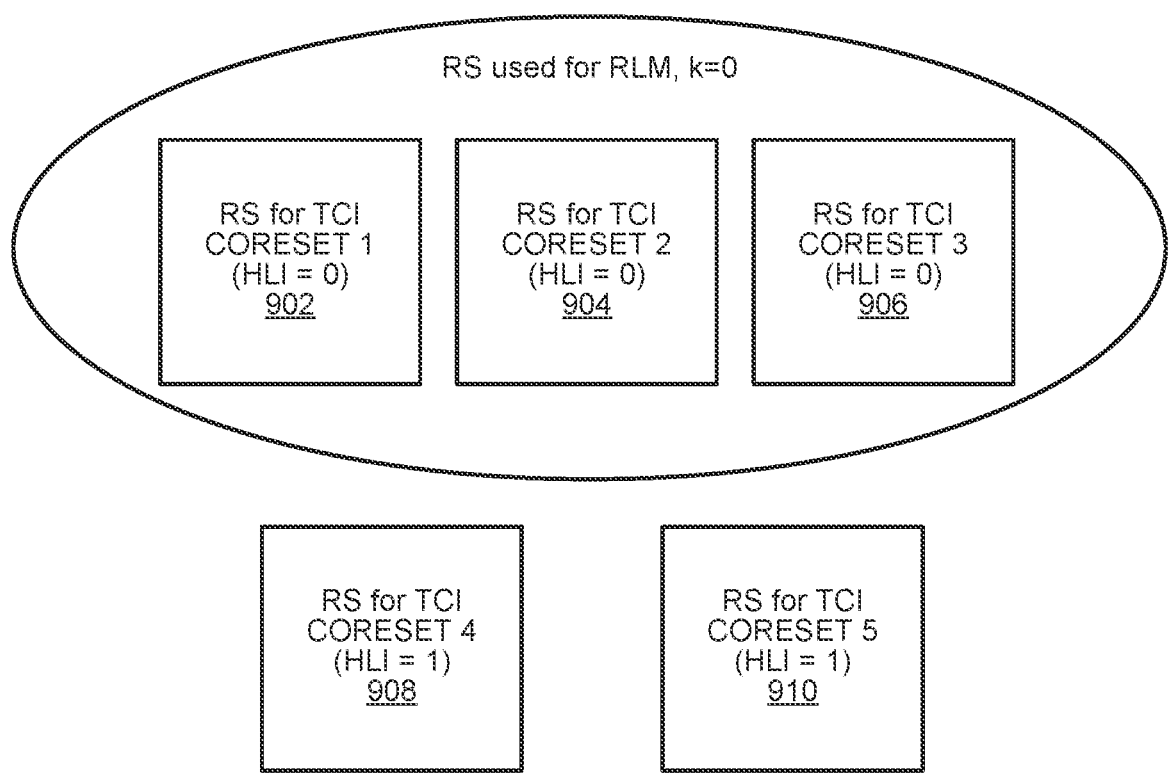
FIGS. 9-11D illustrate various examples of selection of CORESET(s), according to some embodiments.

FIGS. 9-11D illustrate various examples of selection of CORESET(s), according to some embodiments. For example, as illustrated by FIG. 9, a UE, such as UE 106, when configured in multi-DCI mode, may determine which CORESET(s) to monitor based on a value, k, of a higher layer index (HLI). In some embodiments, the value of an HLI for monitoring may be predefined (e.g., specified by a standard) and/or configured via higher layer signaling, such as RRC signaling. As shown in FIG. 9, the value of the HLI for monitoring may be set to 0 (e.g., k=0). Thus, the UE may select CORESETs for monitoring based on the HLI value included in each CORESET. As shown, the UE may select CORESETs 902, 904, and 906 for monitoring based on respective HLI values of these CORESETs being 0 and may not monitor CORESETs 908 and 910 since these CORESETs have an HLI value of 1.

Figure 10A:
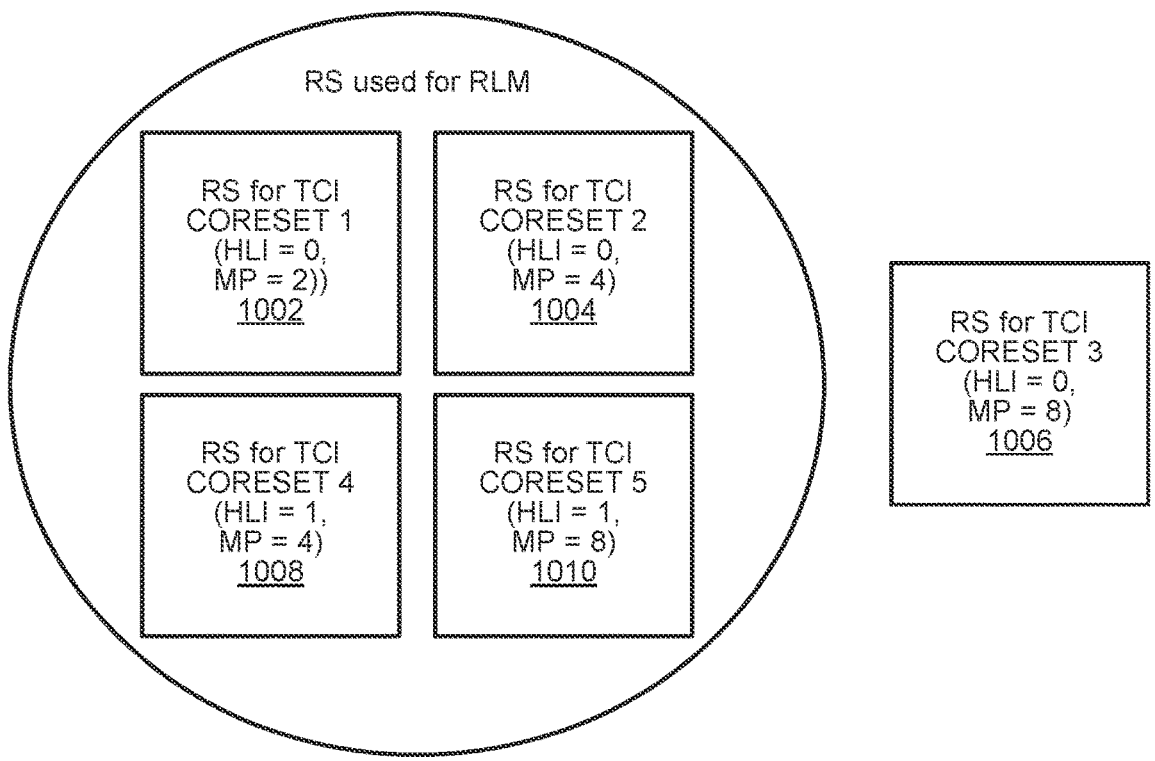
Figure 10B:
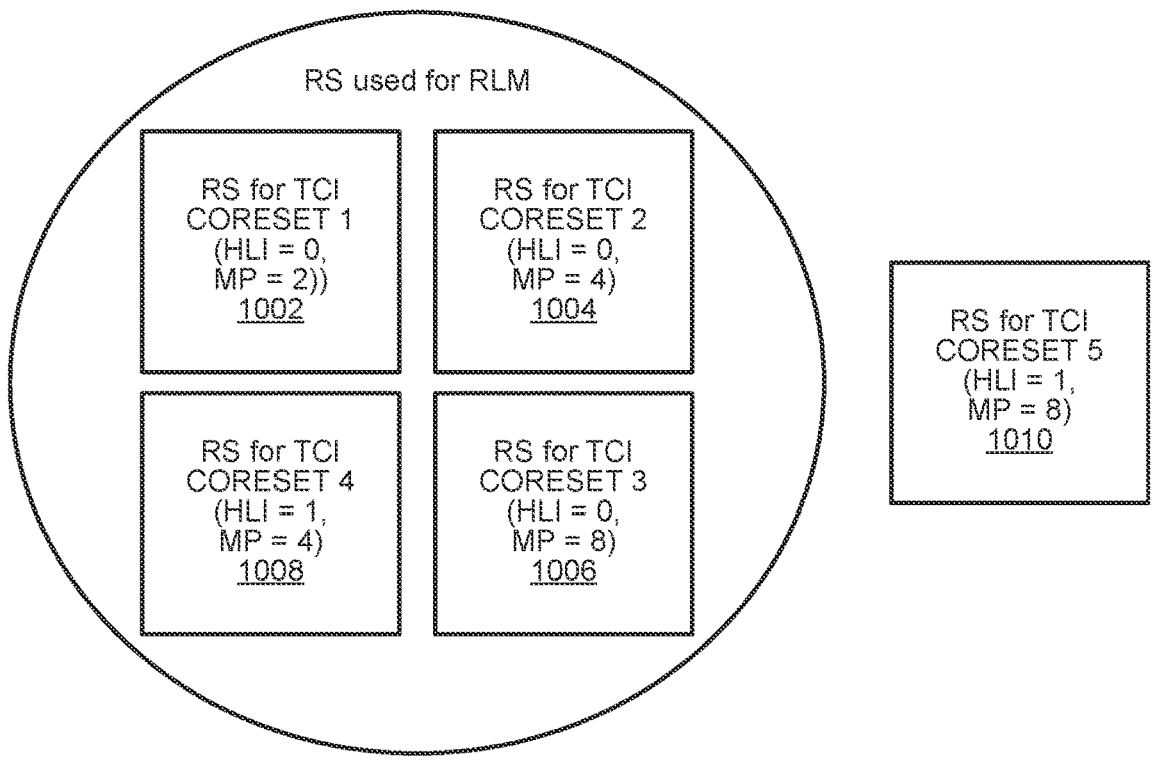

As another example, as illustrated by FIGS. 10A through 10D, a UE, such as UE 106, when configured in multi-DCI mode, may determine which CORESET(s) to monitor based on a comparison of monitoring periodicities of search spaces associated with the CORESETs. As shown in FIGS. 10A-10B, the UE may select CORESETs based on monitoring periodicity, selecting CORESETs from smallest (or lowest) monitoring periodicity to largest (or highest) monitoring periodicity. Thus, as shown in FIGS. 10A-10B, the UE may select CORESET 1002 with a monitoring periodicity of 2 slots as well as CORESETs 1004 and 1008 with a monitoring periodicity of 4 slots. However, since CORESETs 1006 and 1010 have the same monitoring periodicity (8 slots), the UE may base the selection between CORESETs 1006 and 1010 on HLI values of the CORESETs. For example, as shown in FIG. 10A, the UE may select the CORESET with a higher HLI value, e.g., the UE may select CORESET 1010 over CORESET 1006 for monitoring. Alternatively, as another example as shown in FIG. 10B, the UE may select the CORESET with a lower HLI value, e.g., the UE may select CORESET 1006 over CORESET 1010 for monitoring.

Figure 10C:
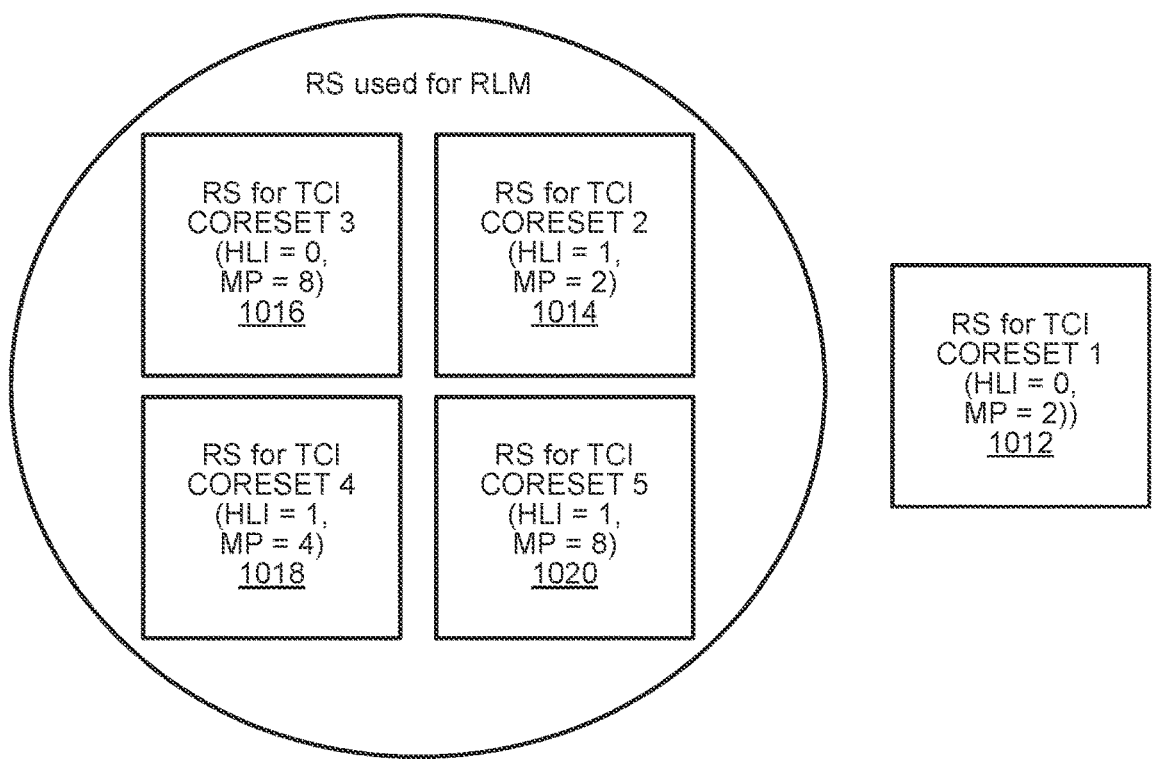
Figure 10D:
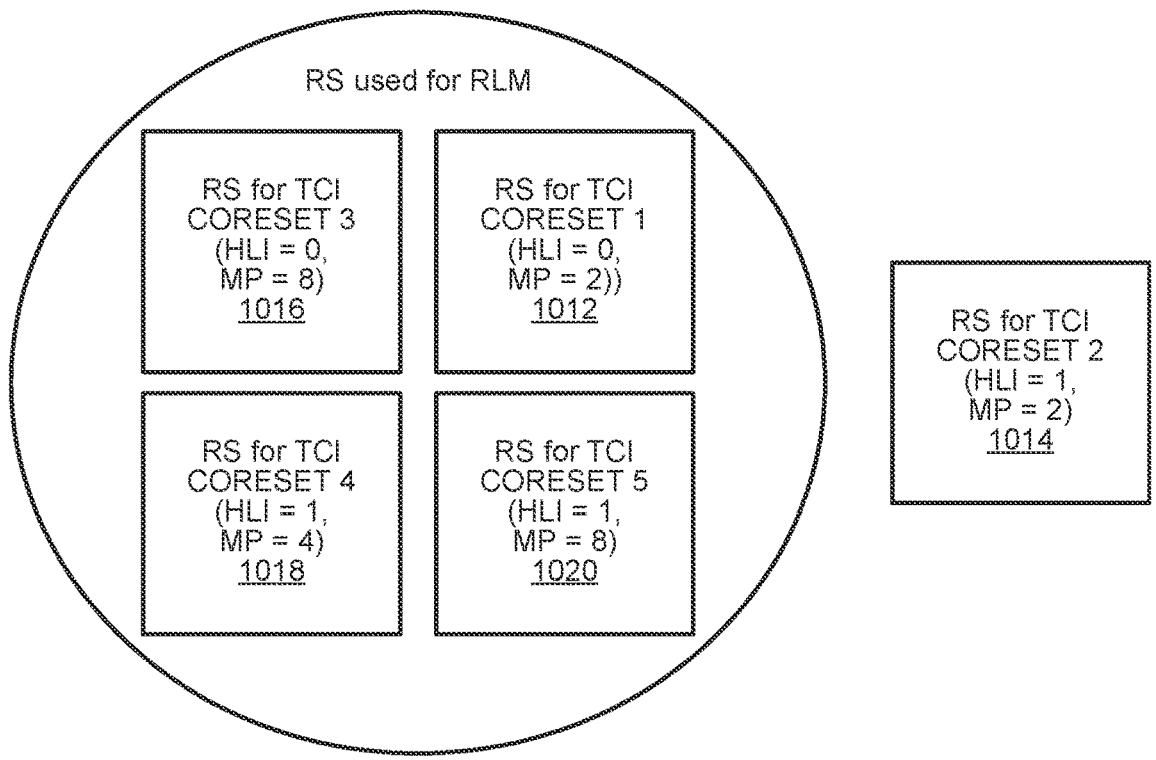

Additionally, as shown in FIGS. 10C-10D, the UE may select CORESETs based on monitoring periodicity, selecting CORESETs from largest (or highest) monitoring periodicity to smallest (or lowest) monitoring periodicity. Thus, as shown in FIGS. 10C-10D, the UE may select CORESETs 1016 and 1020 with a monitoring periodicity of 8 slots as well as CORESET 1018 with a monitoring periodicity of 4 slots. However, since CORESETs 1012 and 1014 have the same monitoring periodicity (2 slots), the UE may base the selection between CORESETs 1012 and 1014 on HLI values of the CORESETs. For example, as shown in FIG. 10C, the UE may select the CORESET with a higher HLI value, e.g., the UE may select CORESET 1014 over CORESET 1012 for monitoring. Alternatively, as another example as shown in FIG. 10D, the UE may select the CORESET with a lower HLI value, e.g., the UE may select CORESET 1012 over CORESET 1014 for monitoring.

Figure 11A:
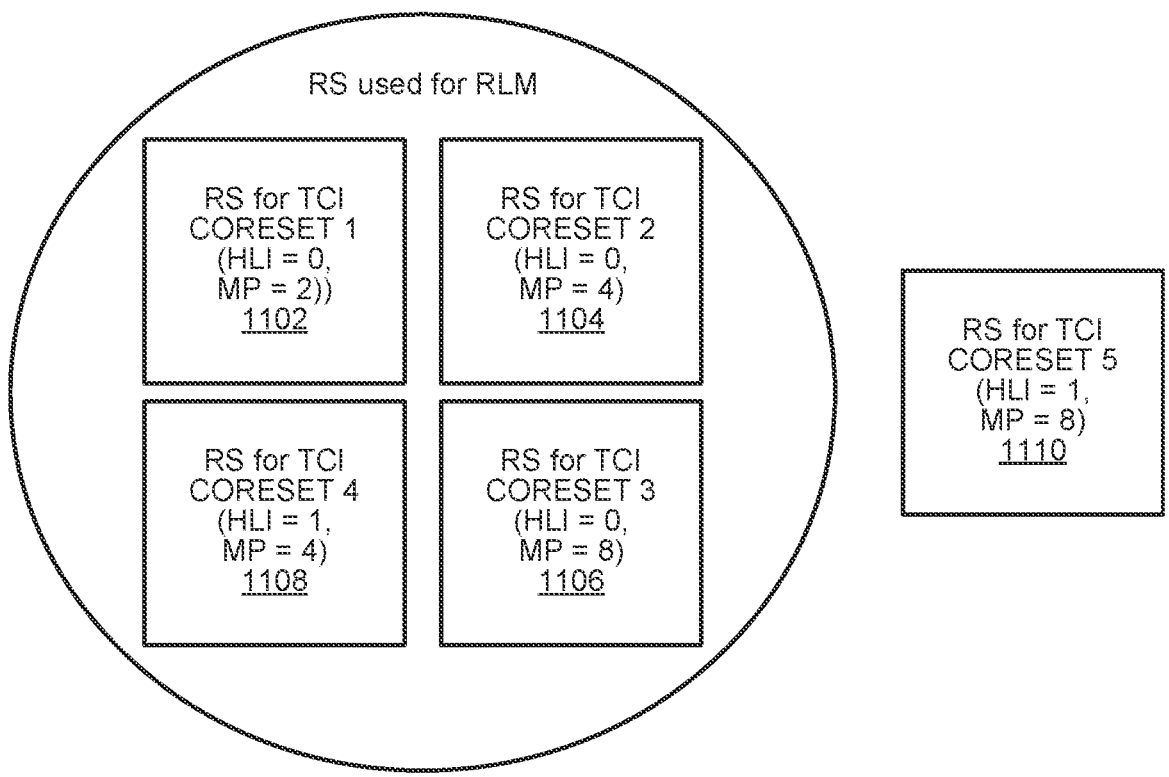
Figure 11B:
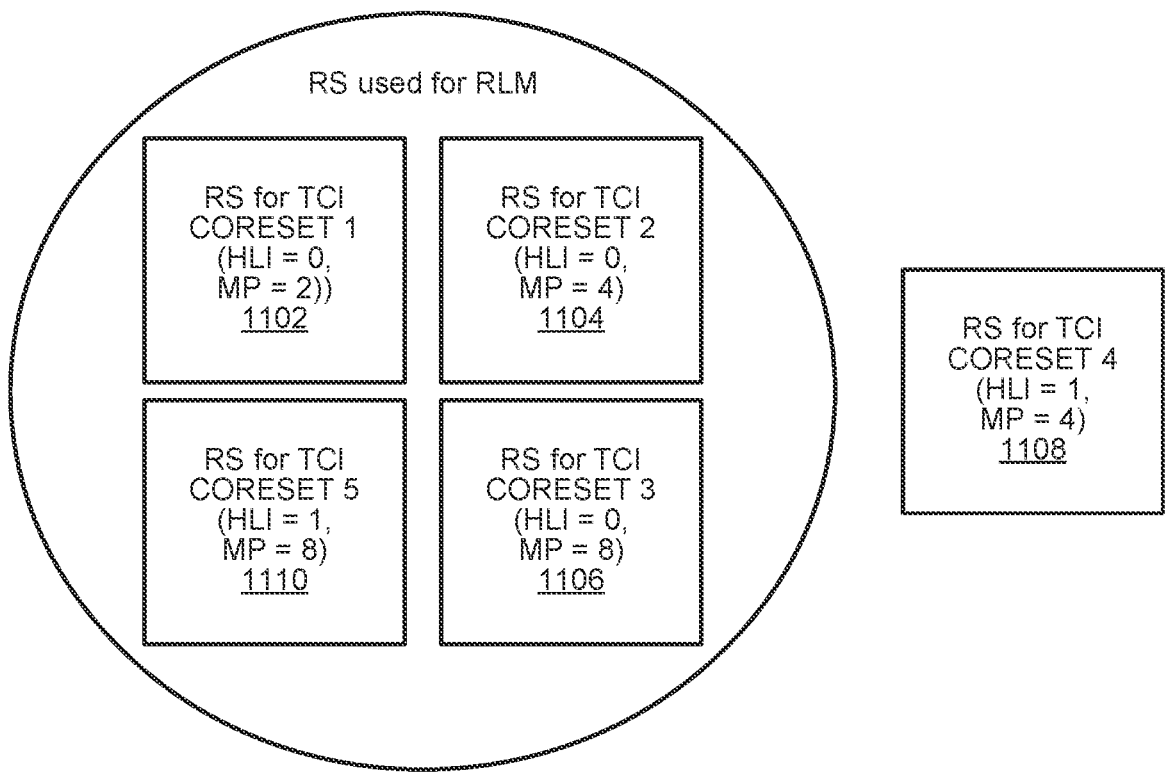

As yet a further example, as illustrated by FIGS. 11A through 11D, a UE, such as UE 106, when configured in multi-DCI mode, may determine which CORESET(s) to monitor based on a comparison of values of HLIs associated with the CORESETs. As shown in FIGS. 11A-11B, the UE may select CORESETs based on HLI value, selecting CORESETs from smallest (or lowest) HLI value to largest (or highest) HLI value. Thus, as shown in FIGS. 11A-11B, the UE may select CORESETs 1102, 1104, and 1106 based on each having an HLI value of 0 as compared to CORESETs 1108 and 1110, which have an HLI value of 1. Note that since CORESETs 1108 and 1110 have the same HLI value (1), the UE may base the selection between CORESETs 1108 and 1110 on monitoring periodicity of search spaces associated with the CORESETs. For example, as shown in FIG. 11A, the UE may select the CORESET with a smaller monitoring periodicity value, e.g., the UE may select CORESET 1108 over CORESET 1110 for monitoring. Alternatively, as another example as shown in FIG. 11B the UE may select the CORESET with a larger monitoring periodicity value, e.g., the UE may select CORESET 1110 over CORESET 1108 for monitoring.

Figure 11C:
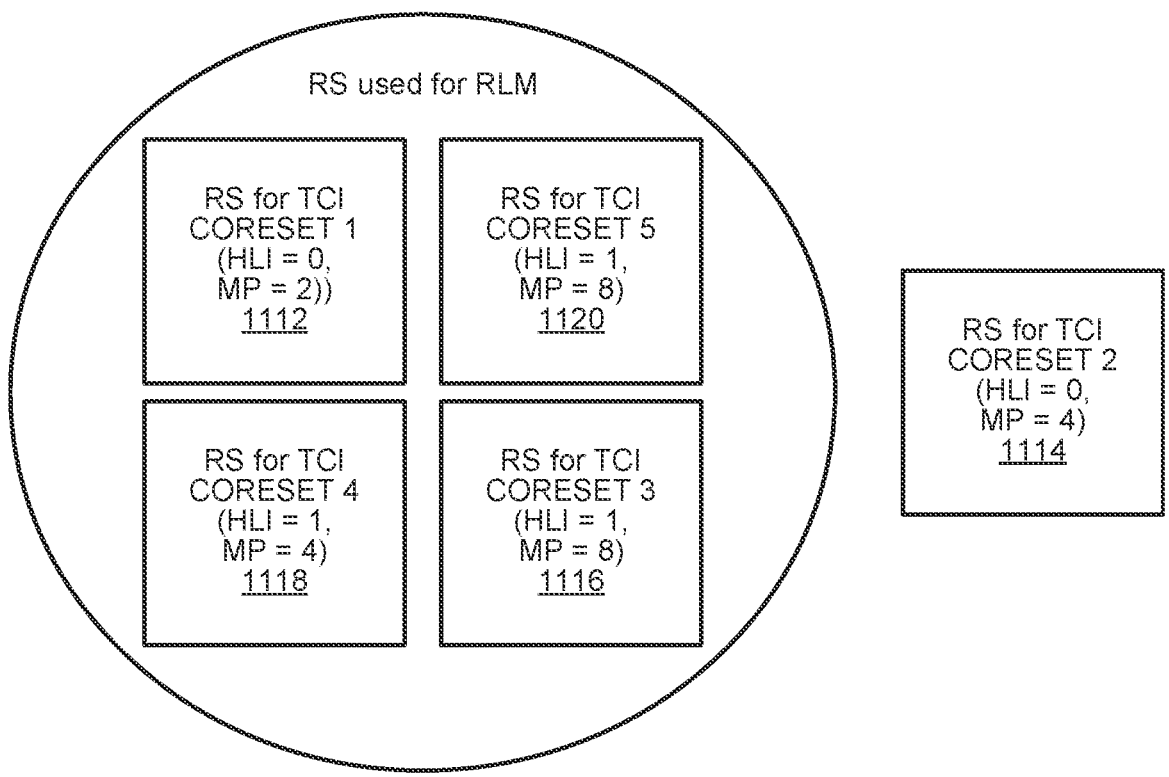
Figure 11D:
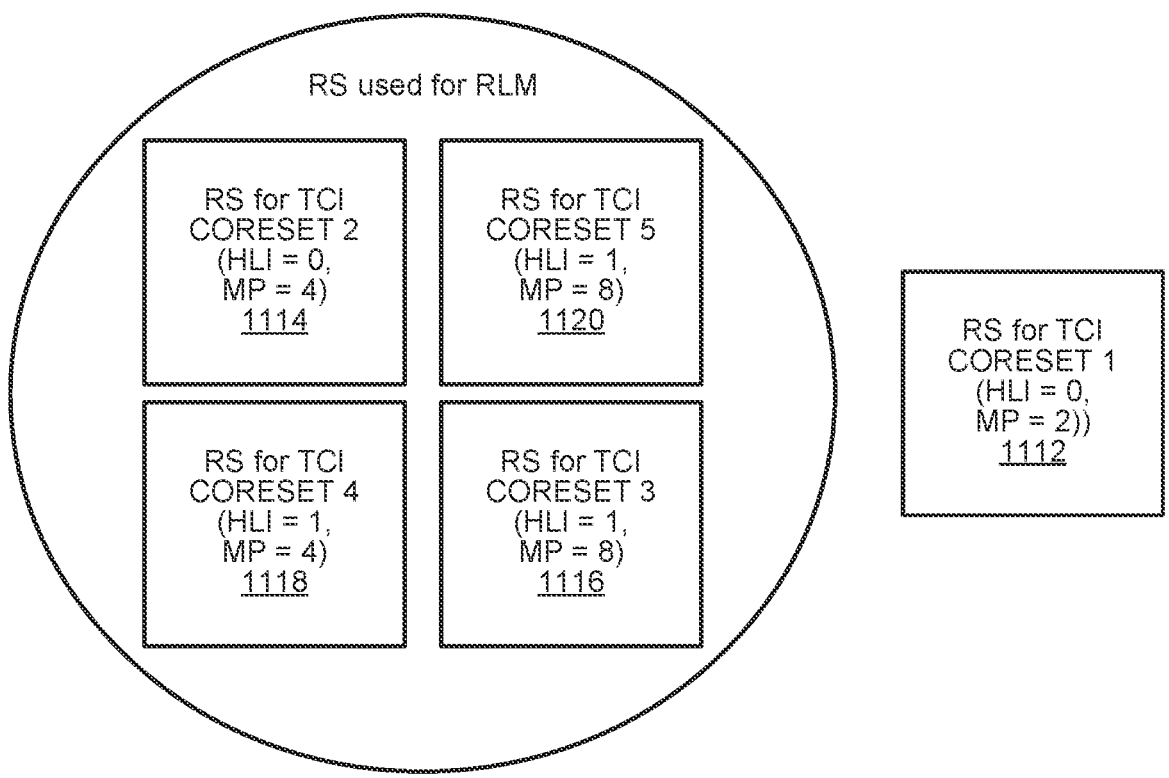

Additionally, as shown in FIGS. 11C-11D, the UE may select CORESETs based on HLI value, selecting CORESETs from largest (or highest) HLI value to smallest (or lowest) HLI value. Thus, as shown in FIGS. 11C-11D, the UE may select CORESETs 1116, 1118, and 1120 based on each having an HLI value of 1 as compared to CORESETs 1112 and 1114, which have an HLI value of 0. Note that since CORESETs 1112 and 1114 have the same HLI value (0), the UE may base the selection between CORESETs 1112 and 1114 on monitoring periodicity of search spaces associated with the CORESETs. For example, as shown in FIG. 11C, the UE may select the CORESET with a smaller monitoring periodicity value, e.g., the UE may select CORESET 1112 over CORESET 1114 for monitoring. Alternatively, as another example as shown in FIG. 11D the UE may select the CORESET with a larger monitoring periodicity value, e.g., the UE may select CORESET 1114 over CORESET 1112 for monitoring.

Figure 12:
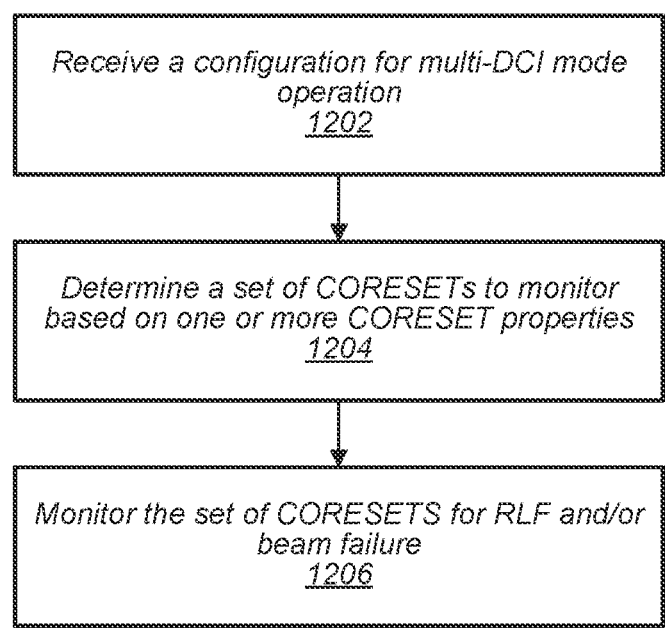
FIG. 12 illustrates a block diagram of an example of a method for perform radio link monitoring for multiple DCI based transmissions, according to some embodiments.

FIG. 12 illustrates a block diagram of an example of a method for perform radio link monitoring for multiple DCI based transmissions, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106, may receive, from a network node, such as gNB 604, a configuration for multiple downlink control information (DCI) mode operation in which a physical downlink shared channel (PDSCH) may be scheduled by multiple DCIs from a number of control resource sets (CORESETs). In other words, the multiple DCIs may schedule the PDSCH from multiple CORESETs. In some embodiments, the number of CORESETs may exceed a number of (concurrently) monitorable CORESETs. In other words, there may be more CORESETs (e.g., 5) than the UE is capable of monitoring concurrently (e.g., 4). Said another way, the number of CORESETs may exceed a number of CORESETs the UE may concurrently monitor. In some embodiments, the multiple CORESETs may have differing transmission control indexes (TCIs). In some embodiments, the multiple CORESETs may be from differing TRPs.

At 1204, the UE may determine a set of CORESETs to monitor, e.g., based, at least in part, on properties associated with a CORESET. In some embodiments, the properties may include a higher layer index and/or a monitoring periodicity of a search space associated with the CORESET. In some embodiments, the higher layer index may be specified (or defined) by a standard and/or by higher layer signaling, such as radio resource control (RRC) signaling. In such embodiments, the UE may select CORESETs based on the higher layer index.

In some embodiments, the UE may select CORESETs based on monitoring periodicity from lowest monitoring periodicity to highest monitoring periodicity. In such embodiments, when multiple CORESETs have identical monitoring periodicities, the UE may select CORESETs from the multiple CORESETs from lowest higher layer index to highest higher layer index. Alternatively, in some embodiments, when multiple CORESETs have identical monitoring periodicities, the UE may select CORESETs from the multiple CORESETs from highest higher layer index to lowest higher layer index.

In some embodiments, the UE may select CORESETs based on monitoring periodicity from highest monitoring periodicity to lowest monitoring periodicity. In such embodiments, when multiple CORESETs have identical monitoring periodicities, the UE may select CORESETs from the multiple CORESETs from lowest higher layer index to highest higher layer index. Alternatively, in some embodiments, when multiple CORESETs have identical monitoring periodicities, the UE may select CORESETs from the multiple CORESETs from highest higher layer index to lowest higher layer index.

In some embodiments, the UE may select CORESETs based on higher layer index from lowest higher layer index to highest higher layer index. In such embodiments, when multiple CORESETs have identical higher layer indexes, the UE may select CORESETs from the multiple CORESETs from lowest monitoring periodicity to highest monitoring periodicity. Alternatively, in some embodiments, when multiple CORESETs have identical higher layer indexes, the UE may select CORESETs from the multiple CORESETs from highest monitoring periodicity to lowest monitoring periodicity.

In some embodiments, the UE may select CORESETs based on higher layer index from highest higher layer index to lowest higher layer index. In such embodiments, when multiple CORESETs have identical higher layer indexes, the UE may select CORESETs from the multiple CORESETs from lowest monitoring periodicity to highest monitoring periodicity. Alternatively, in some embodiments, when multiple CORESETs have identical higher layer indexes, the UE may select CORESETs from the multiple CORESETs from highest monitoring periodicity to lowest monitoring periodicity.

At 1206, the UE may monitor the set CORESETs for at least one of a radio link failure and/or a beam failure. In other words, the UE may select CORESETs for both radio link monitoring and beam failure detection. In some embodiments, the UE may receive, from the network node, a medium access control (MAC) control element (CE) that indicates a new transmission configuration indication (TCI) state for purposes not including radio link monitoring and/or beam failure detection. In such embodiments, the UE may reset one or more counters associated with radio link monitoring and/or beam failure detection. In some embodiments, an N310 counter may be used for out-of-sync failure detections (or indications). In some embodiments, an N311 counter may be used for in-sync failure detections (or indications). In some embodiments, a beam failure indicator counter, such as BFI_COUNTER or BFI_counter, may be reset. In some embodiments, a beam failure recovery timer, such as beam beamFailureRecoveryTimer or rbeamFailureDetectionTimer, may be reset.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for beam failure detection (BFD), comprising:
- receiving, from a network node, a configuration for multiple downlink control information (DCI) physical downlink shared channel (PDSCH) operation that includes higher layer indices (HLIs) associated with groups of one or more control resource sets (CORESETs);
- determining, for a particular value of an HLI associated with a particular group of one or more CORESETs, an order of selection for a reference signal (RS) for beam failure detection (BFD) monitoring in transmission configuration index (TCI) states for a CORESET based on a monitoring periodicity of a search space associated with the CORESET and a CORESET index (ID);
- monitoring the RS with the TCI states for the CORESET for beam failure detection;
- receiving, from the network node, a medium access control (MAC) control element (CE) that indicates a new transmission configuration indication (TCI) state;
- applying the new TCI state; and
- resetting, responsive to applying the new TCI state, one or more counters associated with beam failure detection and one or more counters associated with radio link monitoring (RLM).

2. The method of claim 1,
wherein the order of selection considers a lower associated monitoring periodicity of a search space of the particular group of one or more CORESETs as a highest priority followed by a highest CORESET ID of CORESETs with the same associated monitoring periodicity.

3. The method of claim 1,
wherein the TCI states are associated with respective periodic channel state information reference signals (CSI-RSs).

4. The method of claim 1,
wherein the HLIs correspond to respective transmission and reception points (TRPs).

5. The method of claim 1, further comprising:
selecting the RS with the TCI states for the CORESET for beam failure detection.

6. The method of claim 5, further comprising:
determining the CORESET to monitor based on the selection.

7. The method of claim 1,
wherein the one or more counters associated with RLM include one or more of an N310 counter or an N311 counter.

8. An apparatus, comprising:
- a memory; and
- at least one processor in communication with the memory and configured to:
  - receive, from a network node, a configuration for multiple downlink control information (DCI) physical downlink shared channel (PDSCH) operation that includes higher layer indices (HLIs) associated with groups of one or more control resource sets (CORESETs);
  - determine, for a particular value of an HLI associated with a particular group of one or more CORESETs, an order of selection for a reference signal (RS) for beam failure detection (BFD) monitoring in transmission configuration index (TCI) states for a CORESET based on a monitoring periodicity of a search space associated with the CORESET and a CORESET index (ID);
  - monitor the RS with the TCI states for the CORESET for beam failure detection;
  - receive, from the network node, a medium access control (MAC) control element (CE) that indicates a new transmission configuration indication (TCI) state;
  - apply the new TCI state; and
  - reset, responsive to applying the new TCI state, one or more counters associated with beam failure detection and one or more counters associated with radio link monitoring (RLM).

9. The apparatus of claim 8,
wherein the order of selection considers a lower associated monitoring periodicity of a search space of the particular group of one or more CORESETs as a highest priority followed by a highest CORESET ID of CORESETs with the same associated monitoring periodicity.

10. The apparatus of claim 8,
wherein the TCI states are associated with respective periodic channel state information reference signals (CSI-RSs).

11. The apparatus of claim 8,
wherein the HLIs correspond to respective transmission and reception points (TRPs).

12. The apparatus of claim 8,
wherein the at least one processor is further configured to:
select the RS with the states for the CORESET for beam failure detection.

13. The apparatus of claim 12,
wherein the at least one processor is further configured to:
determine the CORESET to monitor based on the selection.

14. The apparatus of claim 8,
wherein the one or more counters associated with RLM include one or more of an N310 counter or an N311 counter.

15. A user equipment device (UE), comprising:
- at least one antenna;
- at least one radio, wherein the at least one radio is configured to perform cellular communication using at least one radio access technology (RAT);
- one or more processors coupled to the at least one radio, wherein the one or more processors and the at least one radio are configured to perform voice and/or data communications;
- wherein the one or more processors are configured to cause the UE to:
  - receive, from a network node, a configuration for multiple downlink control information (DCI) physical downlink shared channel (PDSCH) operation that includes higher layer indices (HLIs) associated with groups of one or more control resource sets (CORESETs);
  - determine, for a particular value of an HLI associated with a particular group of one or more CORESETs, an order of selection for a reference signal (RS) for beam failure detection (BFD) monitoring in transmission configuration index (TCI) states for a CORESET based on a monitoring periodicity of a search space associated with the CORESET and a CORESET index (ID);

monitor the RS with the TCI states for the CORESET for beam failure detection;

receive, from the network node, a medium access control (MAC) control element (CE) that indicates a new transmission configuration indication (TCI) state;

apply the new TCI state; and reset, responsive to applying the new TCI state, one or more counters associated with beam failure detection and one or more counters associated with radio link monitoring (RLM).

16. The UE of claim 15, wherein the order of selection considers a lower associated monitoring periodicity of a search space of the particular group of one or more CORESETs as a highest priority followed by a highest CORESET ID of CORESETs with the same associated monitoring periodicity.

17. The UE of claim 15, wherein the TCI states are associated with respective periodic channel state information reference signals (CSI-RSs).

18. The UE of claim 15, wherein the HLIs correspond to respective transmission and reception points (TRPs).

19. The UE of claim 15, wherein the one or more processors are further configured to:

select the RS with the TCI states for the CORESET for beam failure detection; and determine the CORESET to monitor based on the selection.

20. The UE of claim 15, wherein the one or more counters associated with RLM include one or more of an N310 counter or an N311 counter.

* * * * *